United States Patent
Song et al.

(10) Patent No.: US 7,406,103 B2
(45) Date of Patent: Jul. 29, 2008

(54) METHOD AND APPARATUS FOR TRANSMITTING DATA IN GIGABIT ETHERNET PASSIVE OPTICAL NETWORK

(75) Inventors: Jae-Yeon Song, Seongnam-si (KR); Jin-Hee Kim, Suwon-si (KR); Se-Youn Lim, Seoul (KR); Jong-Hwa Lee, Suwon-si (KR); Yoon-Sun Lee, Seoul (KR); Seo-Won Kwon, Suwon-si (KR); Jong-Ho Yoon, Goyang-si (KR)

(73) Assignee: Samsung Electronics Co., Ltd., Meatan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 1089 days.

(21) Appl. No.: 10/764,116

(22) Filed: Jan. 23, 2004

(65) Prior Publication Data

US 2004/0196862 A1    Oct. 7, 2004

(30) Foreign Application Priority Data

Feb. 24, 2003   (KR)   .................. 10-2003-0011523
Mar. 5, 2003    (KR)   .................. 10-2003-0013753
Mar. 14, 2003   (KR)   .................. 10-2003-0016222

(51) Int. Cl.
- H04B 10/20    (2006.01)
- H04L 12/44    (2006.01)
- H04Q 11/00    (2006.01)

(52) U.S. Cl. .................. 370/508; 370/390; 370/337; 370/395.53; 370/442; 398/58.75; 398/66; 725/126

(58) Field of Classification Search .............. 370/236.2, 370/353, 395.53, 390, 337, 442, 437, 447, 370/461, 465, 468, 508, 535; 398/52, 58, 398/66, 71, 75, 99; 725/216
See application file for complete search history.

(56) References Cited

FOREIGN PATENT DOCUMENTS

KR    11-004193    1/1999

*Primary Examiner*—Afsar Qureshi
(74) *Attorney, Agent, or Firm*—Cha & Reiter, LLC

(57) ABSTRACT

A method and apparatus for transmitting data from an optical network unit (ONU) to an optical line termination (OLT) in a Gigabit Ethernet passive optical network (GE-PON) on the basis of a time division multiple access (TDMA) scheme are provided. A measurement of a data transmission time when the data is transmitted to the OLT is obtained, and the measured data transmission time is compared with a predetermined normal transmission time. The transmission of the data is maintained if the measured data transmission time is determined to be less than or equal to the normal transmission time from the comparison result. However, if the measured data transmission time is determined to be greater than the normal transmission time, the transmission of the data is stopped.

10 Claims, 10 Drawing Sheets

METHOD AND APPARATUS FOR TRANSMITTING DATA IN GIGABIT ETHERNET PASSIVE OPTICAL NETWORK

CLAIM OF PRIORITY

This application claims priority to an application entitled "METHOD AND APPARATUS FOR TRANSMITTING DATA IN GIGABIT ETHERNET PASSIVE OPTICAL NETWORK," filed in the Korean Intellectual Property Office on Feb. 24, 2003 and assigned Serial No. 2003-11523; filed on Mar. 5, 2003 and assigned Serial No. 2003-13753; and filed on Mar. 14, 2003 and assigned Serial No. 2003-16222, the contents of which are hereby incorporated by reference.

BACKGROUND OF THE INVENTION

1. Field of the Invention

The present invention relates to a Gigabit Ethernet passive optical network (GE-PON) and, more particularly, to an apparatus and method for transmitting data from optical network units (ONUs) to an optical line termination (OLT) in a GE-PON.

2. Description of the Related Art

FIG. 1 shows the configuration of a GE-PON being standardized in IEEE802.3ah EFM to which the present invention is applicable. As shown, a plurality of ONUs 110-1, 110-2 and 110-3 are configured to communicate with one OLT 100. During downstream transmission from the OLT 100 to the ONUs 110-1, 110-2 and 110-3, the OLT 100 broadcasts data to all the ONUs 110-1, 110-2 and 110-3, and each of the ONUs 110-1, 110-2 and 110-3 is configured to receive the intended data from the OLT 100. However, during upstream transmission from the ONUs 110-1, 110-2 and 110-3 to the OLT 100, the ONUs 110-1, 110-2 and 110-3 transmit a frame to the OLT 100 based on a time-division multiple access (TDMA) scheme.

Referring to FIG. 9, if a malfunction occurs in any one of the ONUs during the upstream transmission, the transmission times allocated to the other ONUs may be affected. As can be seen from this drawing, the ONU1 110-1 may succeed in transmitting an ONU1 data frame during a first period, and the ONU2 110-2 fails to transmit an ONU2 data frame within a second period due to the occurrence of an error therein, thereby continuously occupying the transmission line thereafter. As the ONU2 110-2 continuously transmits the erroneous ONU2 data for more than the predefined time, it causes a data collision in a third period, during which the ONU3 110-3 is permitted to transmit an ONU3 data frame. As a result, the entire transmission of the GE-PON will be disabled if such data collusion occurs continuously.

SUMMARY OF THE INVENTION

Therefore, the present invention has been made in view of the above problems and provides additional advantages, by providing a method and apparatus for stably transmitting data from ONUs to an OLT in a GE-PON.

In accordance with an aspect of the present invention, a method for transmitting data from an optical network unit (ONU) to an optical line termination (OLT) in a Gigabit Ethernet passive optical network (GE-PON) on the basis of a time-division multiple access (TDMA) scheme is provided. The method includes the steps of: a) measuring a data transmission time when transmitting the data to the OLT; b) comparing the measured data transmission time with a predetermined normal transmission time; and c) maintaining the transmission of the data if the measured data transmission time is determined to be less than or equal to the normal transmission time based on the comparison outcome, and stopping the transmission of the data if the measured data transmission time is determined to be greater than the normal transmission time.

In accordance with another aspect of the present invention, an apparatus for transmitting data from an ONU to an OLT in a GE-PON on the basis of a TDMA scheme is provided. The apparatus includes a transmission control function block having a switch for outputting the data to be transmitted to the OLT to a transmission line coupled to the OLT in response to an external control signal; and a transmission controller for measuring a data transmission time elapsing from the moment when the transmission of the data has been started, and controlling the switch to maintain the output of the data if the measured data transmission time is less than or equal to a predetermined normal transmission time and stopping the output of the data if the measured data transmission time is greater than the normal transmission time. Preferably, the transmission control function block is located in any one of a physical coding sub-layer (PCS), physical medium attachment (PMA) sub-layer and physical medium dependent (PMD) sub-layer of a physical layer of the ONU.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. For the purposes of clarity and simplicity, a detailed description of known functions and configurations incorporated herein will be omitted as it may make the subject matter of the present invention unclear.

Figure 1:
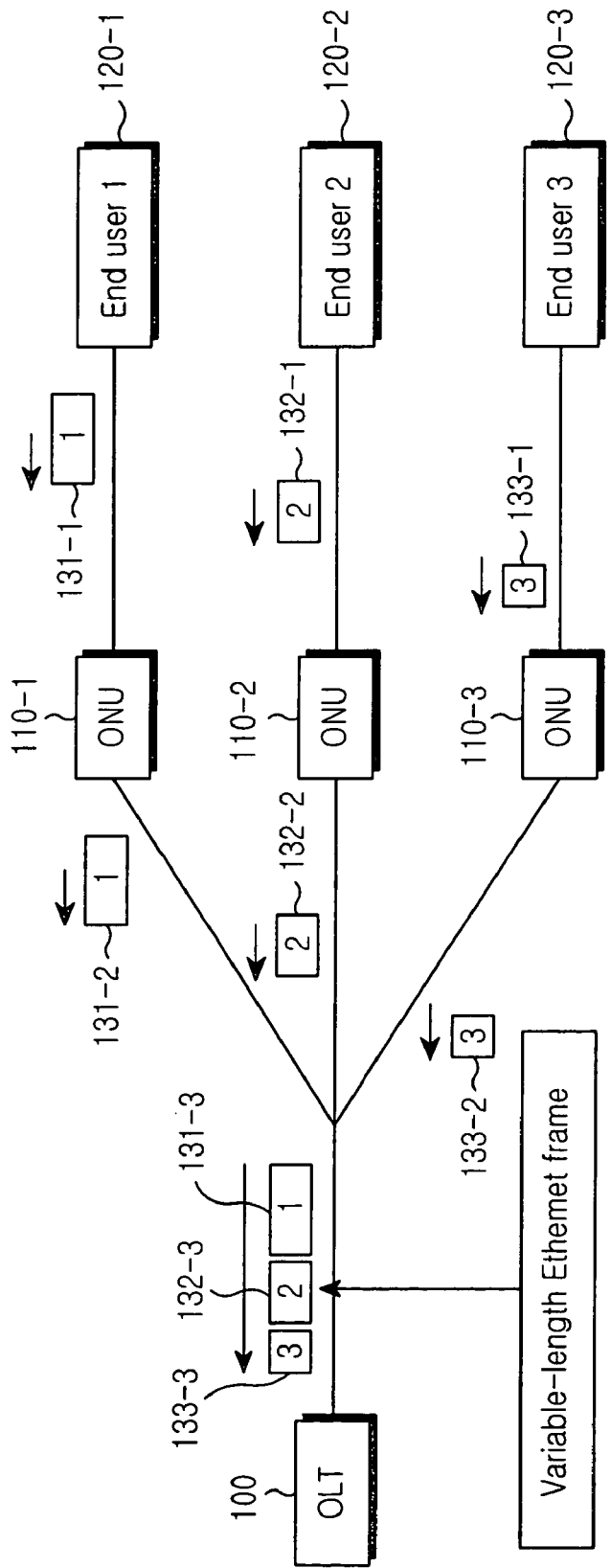
FIG. 1 is a block diagram showing the configuration of a GE-PON to which the present invention is applied.

FIG. 1 is a block diagram showing the configuration of the GE-PON to which the present invention is applied. As shown, the GE-PON includes an OLT 100, a plurality of ONUs 110-1 to 110-3 coupled to the OLT 100, and a plurality of end users (network devices) 120-1 to 120-3 in communication with the ONUs 110-1 to 110-3, respectively. Although a limited number of ONUs is shown in FIG. 1 for illustrative purposes, it is to be understood that the GE-PON can support concurrent communications between a much larger number of ONUs. Thus, the number of ONUs in the drawing should not impose limitations on the scope of the invention.

In operation, the end users 120-1 to 120-3 transmit their respective data 131 to 133 to the OLT 100, respectively, via the ONUs 110-1 to 110-3, and the OLT 100 transmits data to the end users 120-1 to 120-3, respectively, via the ONUs 110-1 to 110-3. In the GE-PON, an Ethernet frame, for example, may be transmitted at a bit rate of 1 Gbps or higher. During the upstream transmission of the GE-PON, the OLT 100 accesses the respective data from the ONUs 110-1 to 110-3 and multiplexes them according to a time-division multiplexing (TDM) scheme. During the downstream transmission of the GE-PON, each of the ONUs 110-1 to 110-3 selects and receives only the intended data out of the data broadcast from the OLT 100.

During the upstream transmission of the GE-PON as stated above, the ONUs 110-1 to 110-3 have to assemble their data and transmit the assembled data over an upstream channel without a collision in their respective TDM timeslots. To this end, according to the teachings of the present invention, if each ONU 110 starts to transmit data to the OLT 100 in the upstream direction, a measurement of the time required to transmit the data is measured, and, if the measured time exceeds a predetermined normal transmission time, the data transmission is stopped. Here, the normal transmission time is the time required for the ONU 110 to transmit the maximum amount of data transmittable at a given time when it occupies a transmission line to the OLT 100. Note that OLT assigns the transmission time to each ONU in the GE-PON protocol.

Figure 2:
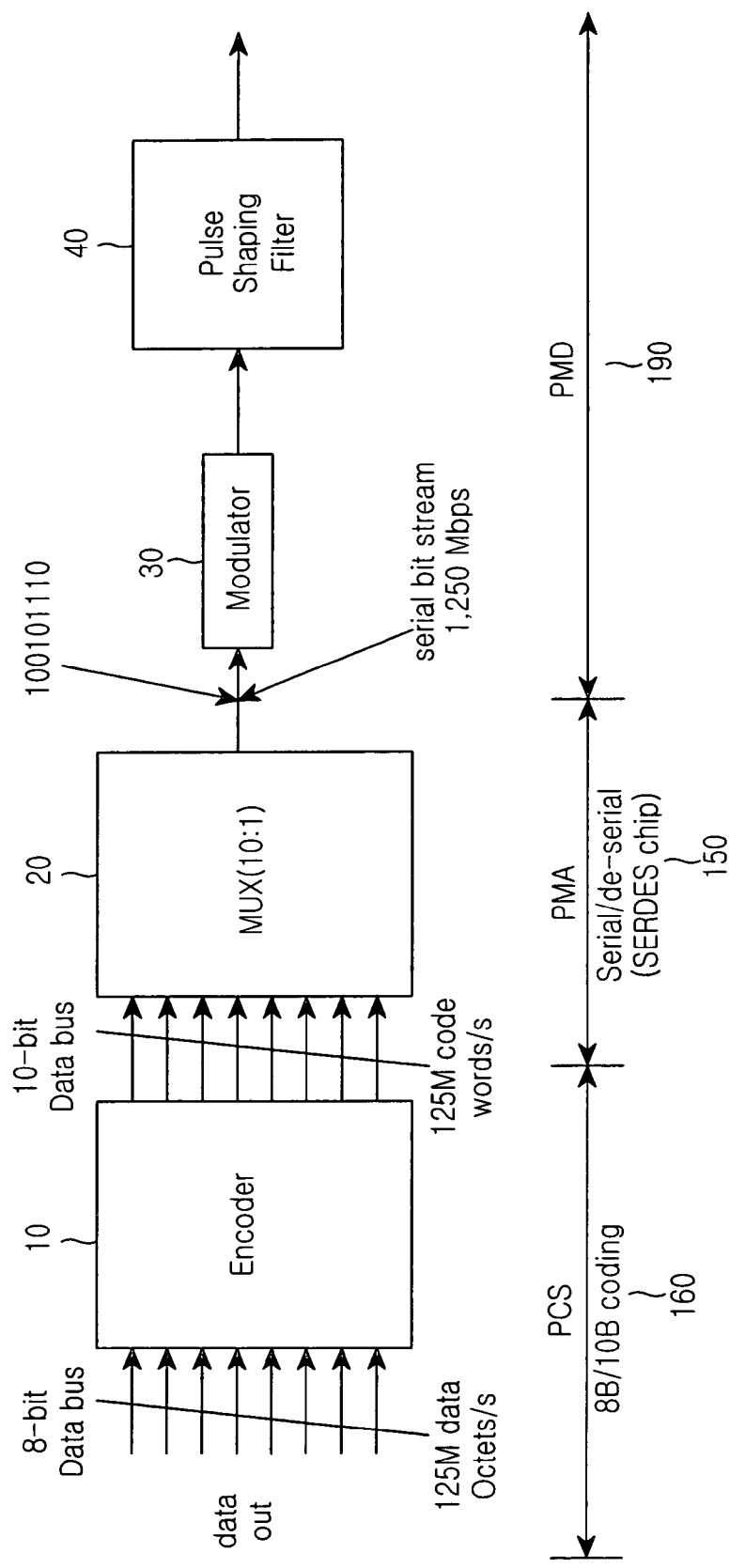
FIG. 2 is a block diagram showing the configuration of an ONU according to a preferred embodiment of the present invention.

The configuration of the ONU 110 operated in the above manner is shown in FIG. 2. The ONU 110 includes a media access control (MAC) layer and a physical layer. The physical layer includes a physical coding sub-layer (PCS) 160, a physical medium attachment (PMA) sub-layer 150, and a physical medium dependent (PMD) sub-layer 190. The PCS 160 performs an 8B/10B-coding operation for transmission and a 10 B/8 B-decoding operation for reception. The PMA sub-layer 150 performs a data serialization/deserialization operation, and the PMD sub-layer 190 performs a modulation/pulse shaping operation to transmit data while loading it onto the transmission line. This configuration of the ONU 110 shown in FIG. 2 is conformable to the IEEE802.3 standard.

Because the present invention is related to data transmission of the ONU 110 or OLT 100, only constituent elements of the respective sub-layers associated with the data transmission are shown in FIG. 2. In connection with the data transmission, the PCS 160 includes an encoder 10 for encoding data from an upper layer, the PMA sub-layer 150 includes a multiplexer 20 for multiplexing data from the encoder 10, and the PMD sub-layer 190 includes a modulator 30 for modulating the multiplexed data and a pulse shaping filter 40 for generating a pulse signal of the modulated data.

Figure 3:
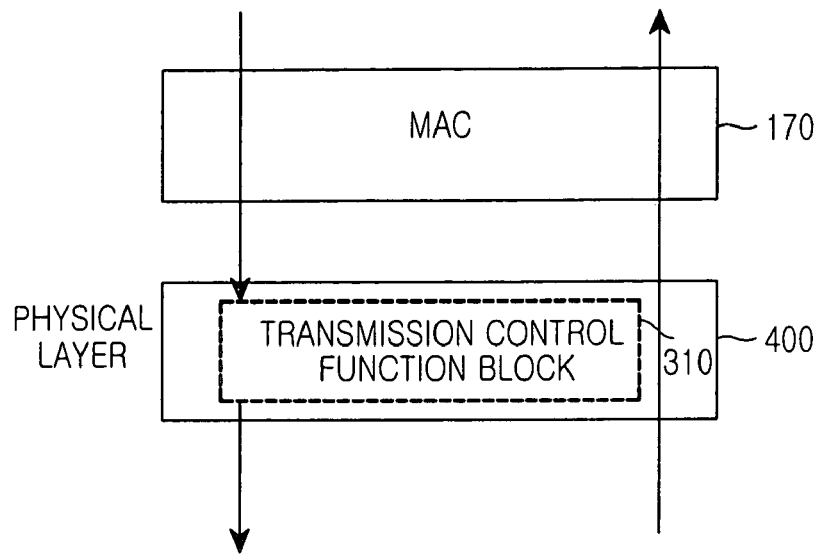
FIG. 3 depicts the arrangement of a transmission control function block in the ONU according to the embodiment of the present invention.

Referring to FIG. 3, the physical layer further includes a transmission control function block 310 for sensing and blocking the transmission of erroneous data from the upper layer in addition to the PCS 160, PMA sub-layer 150 and PMD sub-layer 190. The transmission control function block 310 can be located at a desired position of the physical layer 400 with the PCS, PMA sub-layer, and PMD sub-layer for data transmission/reception of the physical layer 400.

Figure 4:
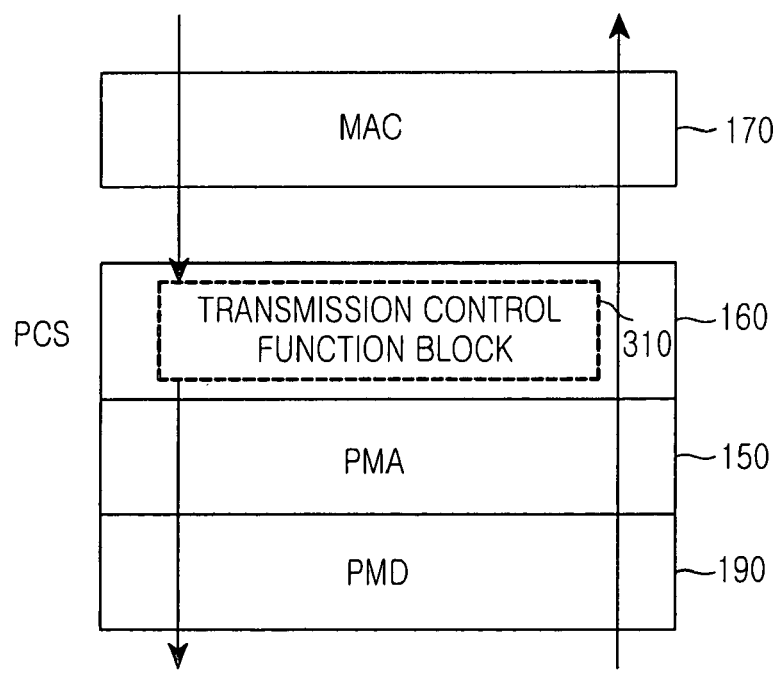
FIGS. 4 to 6 illustrate different locations of the transmission control function block in a physical layer of the ONU according to the embodiment of the present invention.
Figure 5:
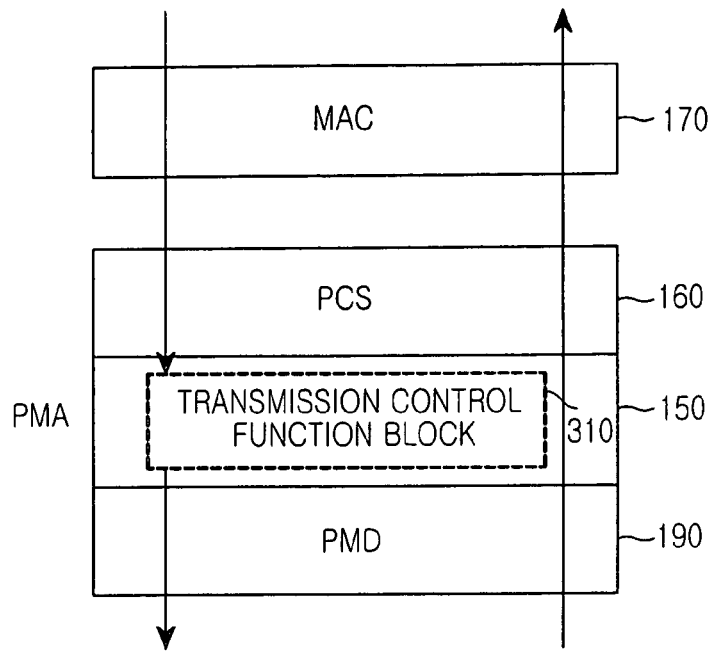
Figure 6:
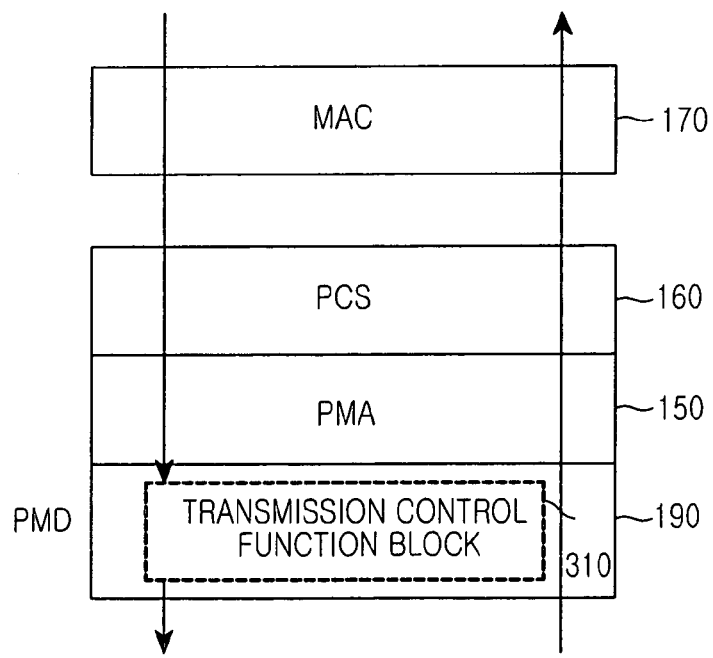

FIGS. 4 to 6 show different locations of the transmission control function block 310 in the physical layer 400 according to the embodiment of the present invention. The transmission control function block 310 can be located in the PCS 160 to sense and block erroneous data coming downstream from the MAC layer 170, as shown in FIG. 4, or in the PMA sub-layer 150 to sense and block erroneous data from the PCS 160, as shown in FIG. 5. Alternatively, the transmission control function block 310 may be located in the PMD sub-layer 190, as shown in FIG. 6. In this manner, the transmission control function block 310 according to the present invention is located, not in every sub-layer of the physical layer, but in any one sub-layer thereof.

Figure 7:
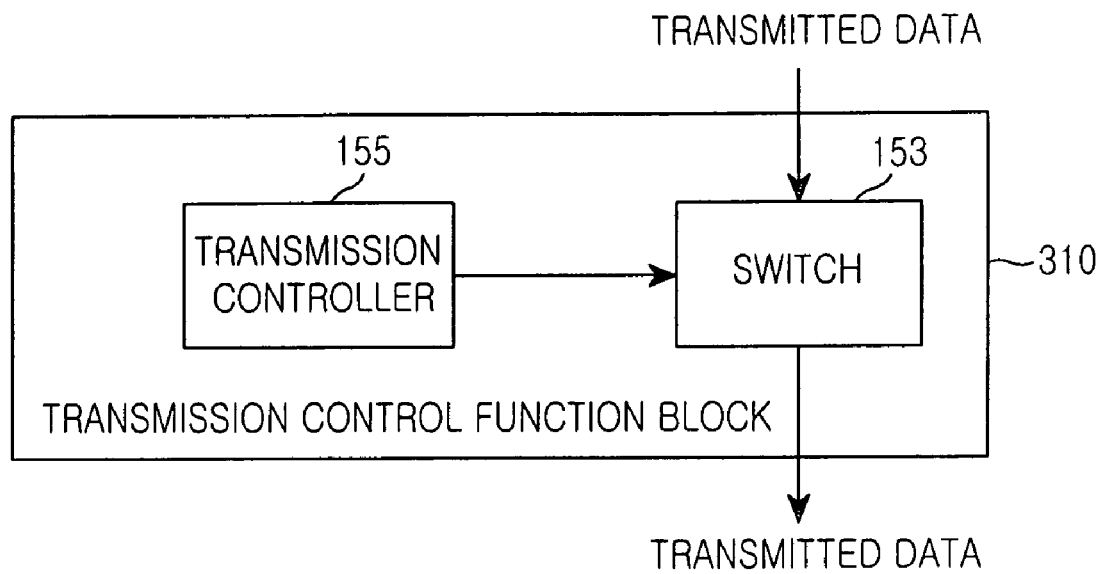
FIG. 7 is a block diagram showing the structure of the transmission control function block according to the embodiment of the present invention.

FIG. 7 is a block diagram showing the structure of the transmission control function block 310 according to the embodiment of the present invention. As shown, the transmission control function block 310 includes a switch 153 and a transmission controller 155.

In operation, the switch 153 is turned on/off under the control of the transmission controller 155 to output input data to the transmission line, or stop the data output. The transmission line interconnects the OLT 100 and the ONU 110. The transmission controller 155, if output data from the upper layer is transmitted to the switch 153, is adapted to drive a timer to measure the time required for the data transmission and determine from the measured result whether or not the transmitted data is normal. In particular, if the measured data transmission time is less than or equal to the predetermined normal transmission time, the transmission controller 155 determines the transmitted data to be normal and thus keeps the switch 153 on. However, if the measured data transmission time is greater than the predetermined normal transmission time, the transmission controller 155 determines the transmitted data to be abnormal and thus turns the switch 153 off so as to stop the data output to the transmission line.

Accordingly, the transmission controller 155 acts to recognize the occurrence of an error in the upper layer based on the time required for data transmission. In the present embodiment, the transmission controller 155 may be, for example, a jabber controller.

Figure 8:
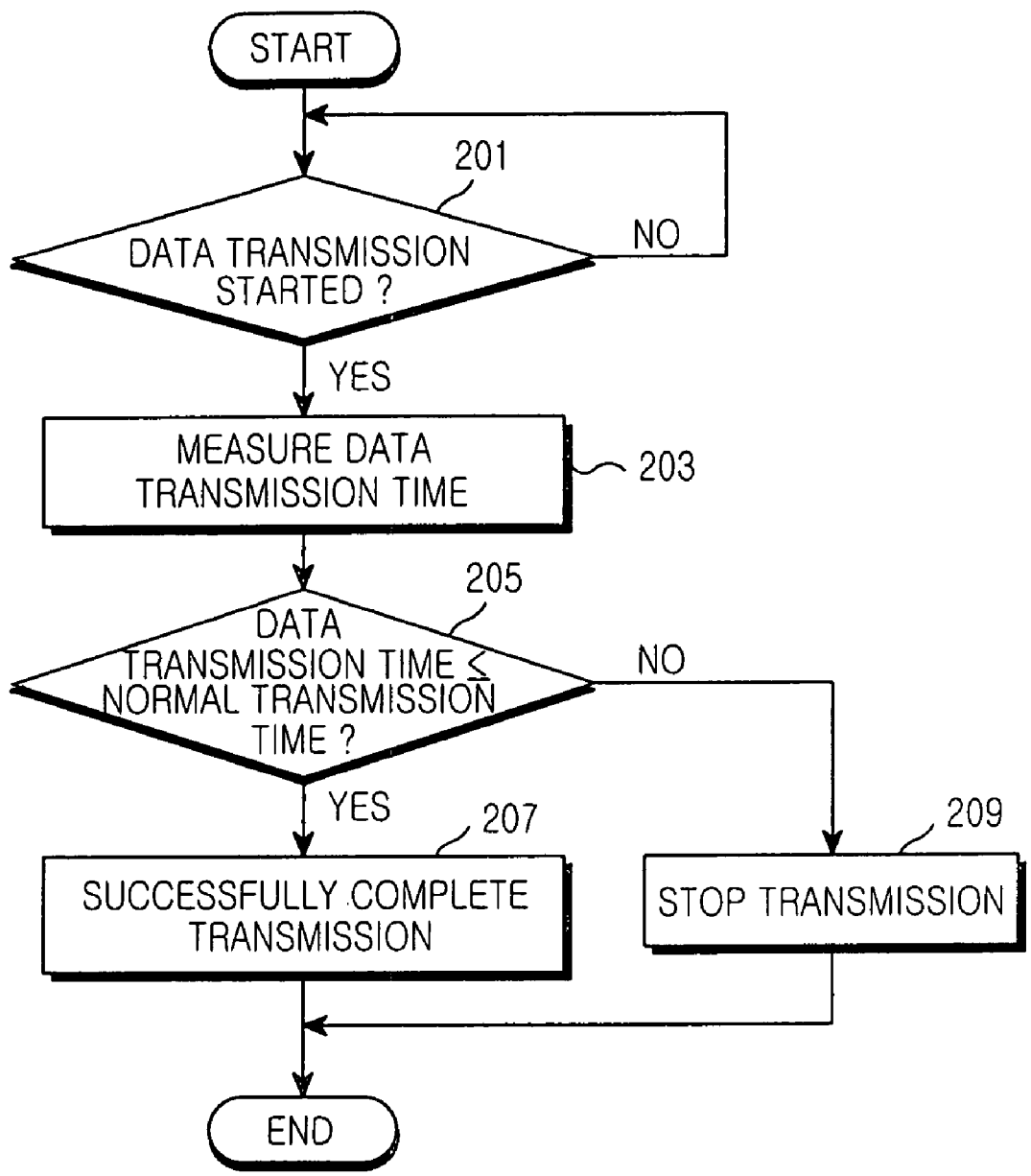
FIG. 8 is a flow chart illustrating the operation of the ONU according to the embodiment of the present invention.
Figure 9:
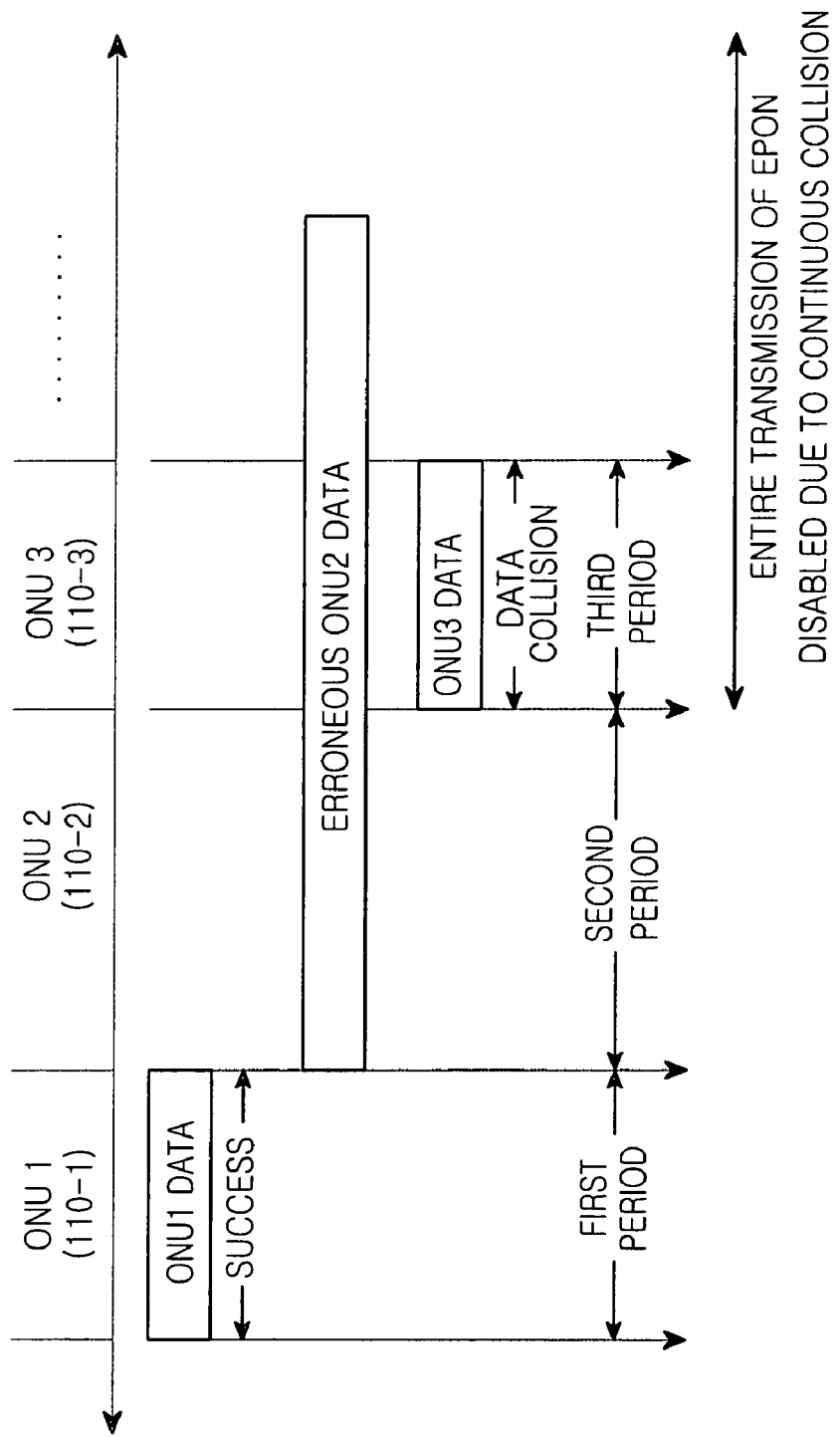
FIG. 9 is a view illustrating the effects of an ONU error on the GE-PON.

Referring to FIG. 8, the operation of the ONU 110 will be described in detail. First, the ONU 110 determines at step 201 whether the transmission of data to the OLT 100 has been started, and then proceeds to step 203 if the data transmission has been started. At step 203, the ONU 110 measures a data transmission time elapsing from the moment when the data transmission has been started, and then proceeds to step 205. The ONU 110 compares the data transmission time measured at step 203 with the predetermined normal transmission time at step 205. The ONU 110 proceeds to step 207 if the measured data transmission time is determined to be less than or equal to the normal transmission time from the comparison result, and to step 209, otherwise. Here, the fact that the measured data transmission time is less than or equal to the normal transmission time signifies that the transmitted data is normal and the data transmission is performed normally. If the measured data transmission time exceeds the normal transmission time, it signifies that the transmitted data is abnormal and the data transmission may be in error. As a result, at step 207, the ONU 110 successfully completes the data transmission and then ends it. However, at step 209, the ONU 110 stops the data transmission and then ends the operation.

As stated above, according to the present invention, the ONU 110 can sense and block erroneous data during the upstream transmission, thereby enabling the entire data transmission of the GE-PON to be smoothly carried out, as will be described in further detail with reference to FIG. 10.

Figure 10:
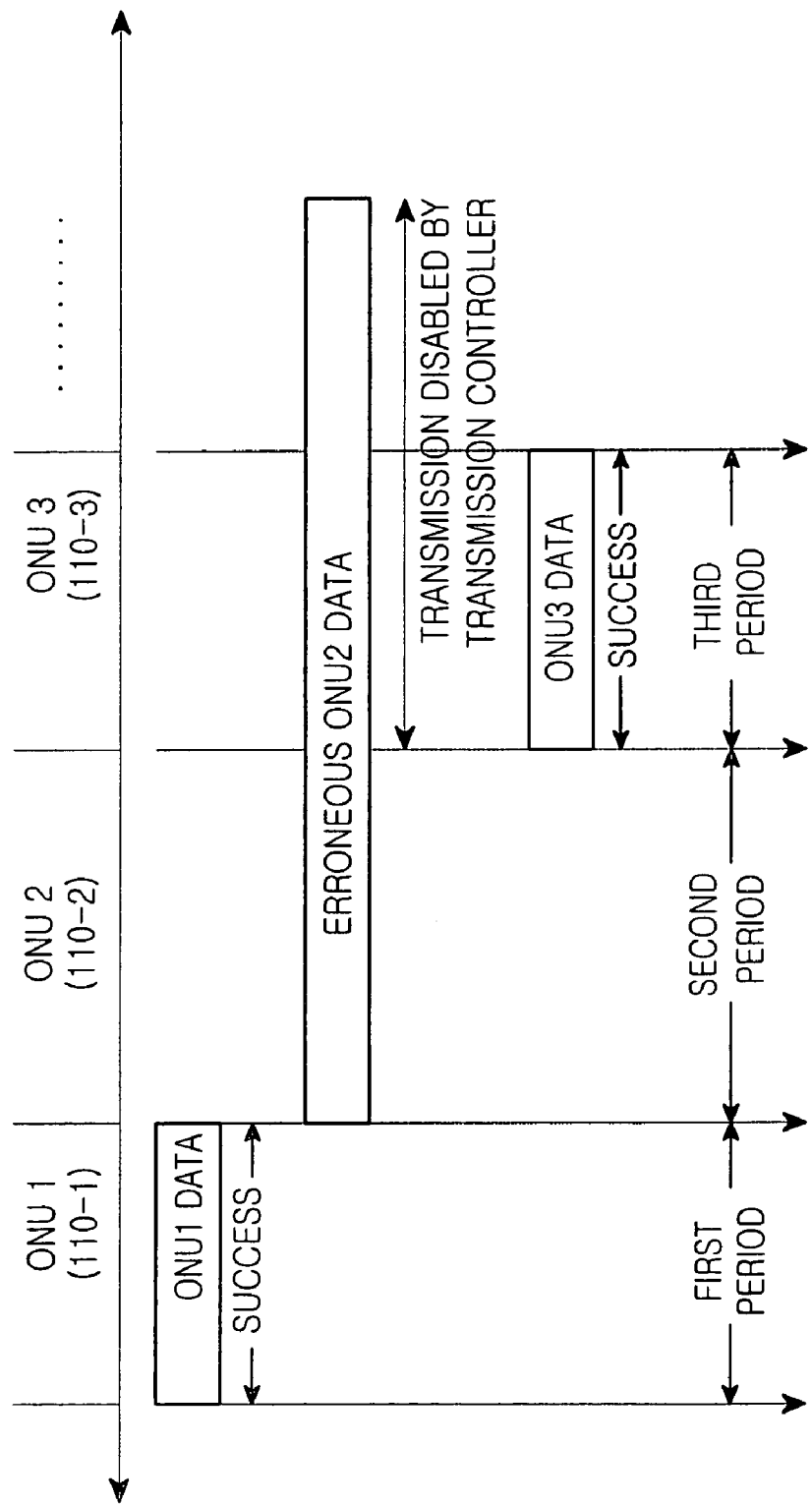
FIG. 10 illustrates the blockage of an ONU error according to the embodiment of the present invention.

FIG. 10 illustrates the blockage of an ONU error according to the embodiment of the present invention, wherein it is assumed that abnormal data occurs in the ONU2 110-2. As shown in this drawing, the ONU1 110-1 successfully transmits ONU1 data for a first period where it performs the data transmission. In a second period where the ONU2 110-2 performs the data transmission, it senses erroneous ONU2 data via the transmission controller 115 and then drives the switch 153 to stop the data transmission of the ONU2 at a start point of a third period where the ONU3 110-3 is scheduled to perform the data transmission. As a result, the ONU3 110-3 can normally transmit ONU3 data during the third period, and the entire data transmission of the GE-PON can thus be smoothly carried out.

As described above, the transmission control function block 310 including, for example, a jabber controller can be randomly located in the PCS, PMA sub-layer, and PMD sub-layer of the physical layer for the data transmission and reception of the physical layer to sense and block erroneous data coming downstream from the upper layer.

Note that an EPON MAC layer, more specifically a multipoint MAC control layer that is an upper layer of the MAC layer 170, generates a laser control signal to turn on/off a laser of the PMD sub-layer, which is the lower layer of the PMA sub-layer. When transmitting no data, it is preferable for an ONU/ONT to turn off a laser, which is operable as a noise source during data transmission of other ONUs/ONTs, such that it does not disturb the data transmission thereof. Therefore, in the case where the transmission controller is applied to the EPON, it is preferable to turn off the laser when the data transmission is disabled by the transmission control function block 310 for the above reason.

In the above-described embodiment of the present invention, the transmission control function block 310 is operated irrespective of the laser control. For this reason, provided that the transmission control function block 310 is operated under the condition, the laser is turned on.

In an alternative embodiment of the present invention, the laser has the same state as that of a laser control when data is transmitted by the transmission control function block 310, so that the data transmission is disabled by the transmission control function block 310. A function block including such a laser and laser controller will be hereinafter referred to as a laser control block.

Figure 11:
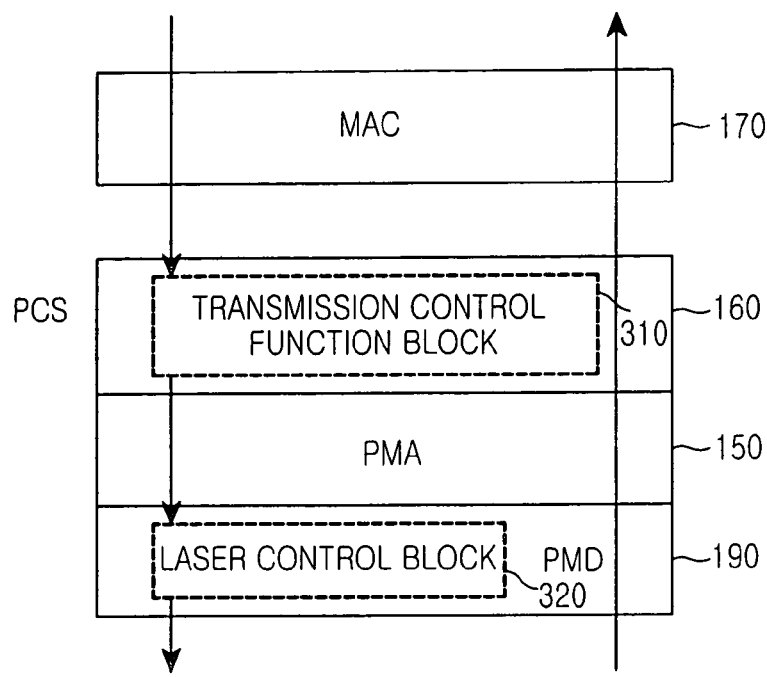
FIGS. 11 to 13 illustrate different configurations of an ONU according to an alternative embodiment of the present invention; and, FIG. 14 shows the structure of a laser control block according to the alternative embodiment of the present invention.
Figure 12:
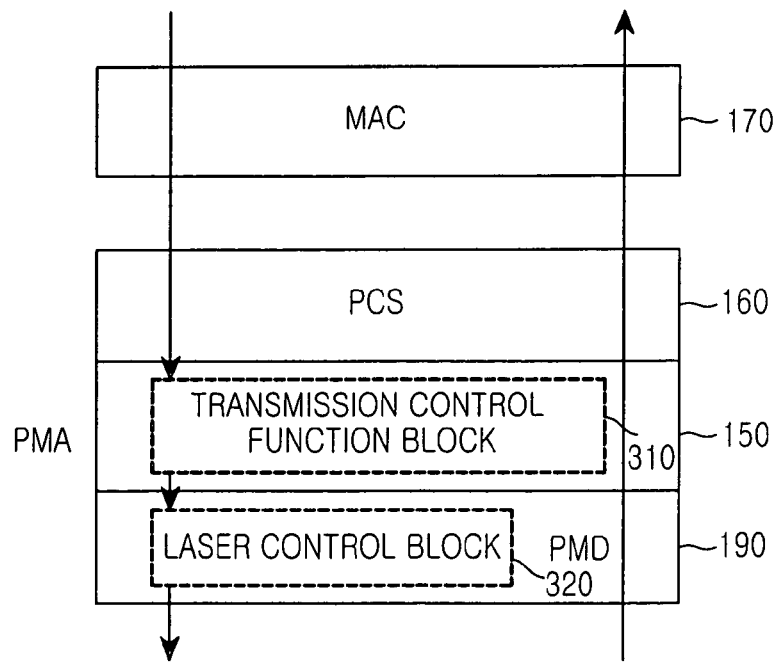
Figure 13:
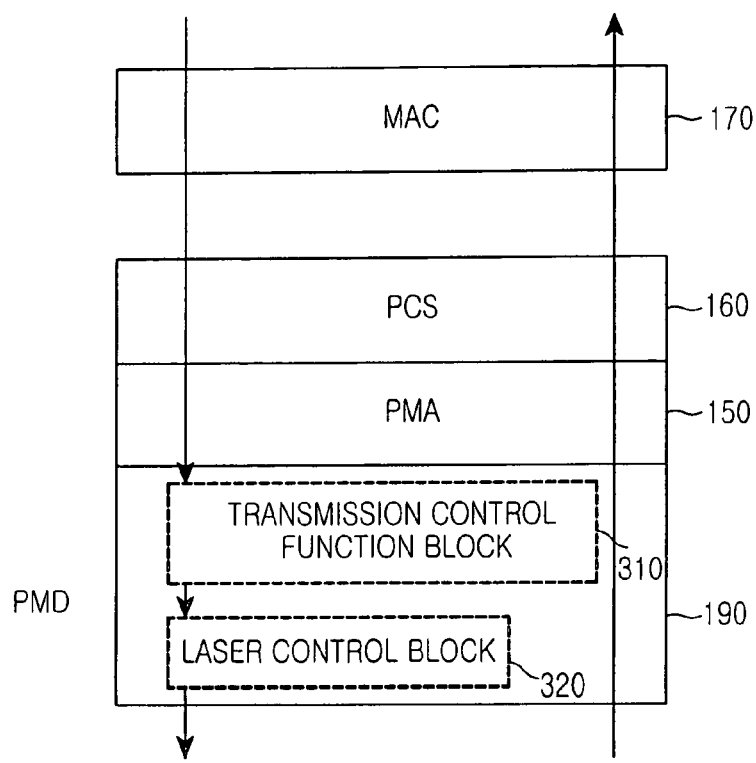

FIGS. 11 to 13 show different configurations of an ONU according to the alternate embodiment of the present invention. As shown, the transmission control function block 310 is shown to be located in any one of the PCS, PMA sub-layer, and PMD sub-layer of the physical layer, while a laser control block 320 is located in the PMD sub-layer 190.

Referring back to FIG. 3, the ONU 110 includes the MAC layer 170 and the physical layer 400, which includes the PCS 160, PMA sub-layer 150, and PMD sub-layer 190. This configuration of the ONU 110 is based on a hierarchical structure of the IEEE802.3 standard. The ONU 110 further includes the above-described transmission control function block 310 located in any one of the PCS 160, PMA sub-layer 150 and PMD sub-layer 190 of the physical layer 400, and the laser control block 320 interoperable with the transmission control function block 310 and located in the PMD sub-layer 190.

The laser control block 320 has the same control state as the laser control state when data is transmitted from the transmission control function block 310, thus it always keeps the laser off irrespective of a laser control command coming downstream from the upper layer when no data is transmitted from the transmission control function block 310.

Figure 14:
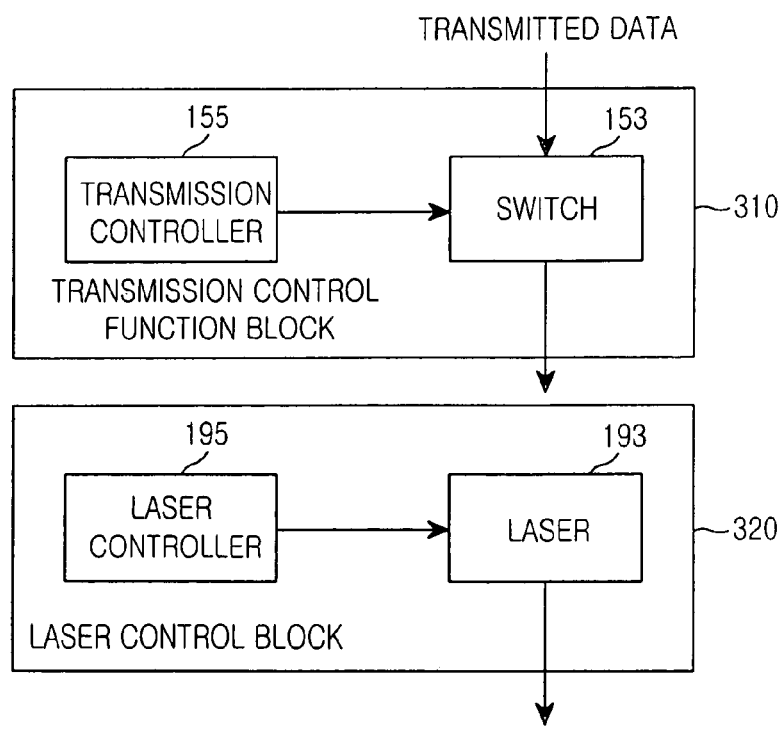

FIG. 14 is a block diagram showing the structure of the laser control block 320 according to the alternate embodiment of the present invention. As shown, the laser control block 320 of the PMD sub-layer 190 includes a laser 193 for transmitting data from the upper layer to the transmission line, and a laser controller 195 for controlling the laser 193. The laser 193 is turned on under the control of the laser controller 195 to transmit data from the upper layer to the transmission line.

The laser controller 195 receives a laser control signal from the multipoint MAC control layer that is the upper layer of the MAC layer 170. The laser controller 195 further receives a transmission control signal from the transmission control function block 310.

The transmission control signal from the transmission control function block 310 is a control signal that the block 310 outputs as a result of a determination based on the time required for data transmission as to whether data is normal or not, as stated previously. This control signal is applied to the switch 153 to turn it on/off. The turning-on of the switch 153 is performed to continue the output of data to the transmission line, and the turning-off of the switch 153 is performed to stop the output of data to the transmission line.

In the alternate embodiment of the present invention, the laser controller 195 of the laser control block 320 is adapted, when the upper layer is normally operated, to control the laser 193 in response to the laser control signal since the transmission control signal from the transmission control function block 310 is outputted to turn on the switch 153. That is, upon determining on the basis of the control signal from the transmission control function block 310 that the upper layer is normally operated, the laser controller 195 of the laser control block 320 outputs the same value as that of the laser control signal, the output of the multipoint MAC control layer, to have the same control state as the existing laser control state.

According to the alternate embodiment of the present invention, the laser controller 195 of the PMD sub-layer 190 is also adapted, when an abnormal data frame is transmitted from the upper layer, to keep the laser 193 off irrespective of the laser control signal from the multipoint MAC control layer since the transmission control signal from the transmission control function block 310 is outputted to turn off the switch 153.

In other words, upon determining on the basis of the control signal from the transmission control function block 310 that the upper layer is abnormally operated, the laser controller 195 keeps the laser 193 off irrespective of the laser control signal from the multipoint MAC control layer.

As apparent from the above description, the present invention provides a method and apparatus for transmitting data from ONUs to an OLT in a GE-PON, wherein, during data transmission, the occurrence of abnormal data is sensed and the transmission thereof is blocked, so that the remaining data transmission can be smoothly performed.

Furthermore, according to the present invention, if it is determined on the basis of a control signal from a transmission controller that an upper layer is abnormally operated, a laser, which is operable as a noise source, is turned off so as not to disturb data transmission of other units.

Furthermore, according to the present invention, a transmission control function block can be located in any one of a PCS, PMA sub-layer and PMD sub-layer of a physical layer to output a control signal that is available in connection with a laser control.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A method for transmitting data from an optical network unit (ONU) to an optical line termination (OLT) in a Gigabit Ethernet passive optical network (GE-PON) using a time division multiple access (TDMA) scheme, comprising the steps of:
    a) measuring a data transmission time when transmitting said data to said OLT;
    b) comparing the measured data transmission time with a predetermined normal transmission time; and,
    c) maintaining the transmission of said data if said measured data transmission time is less than or equal to said normal transmission time, and stopping the transmission of said data if said measured data transmission time is greater than said normal transmission time.

2. An apparatus for transmitting data from an ONU to an OLT in a GE-PON using a TDMA scheme, said apparatus comprising a transmission control function block including:
    a switch for outputting said data to be transmitted to said OLT to a transmission line coupled to said OLT in response to an external control; and,
    a transmission controller for measuring a data transmission time elapsing from the moment when the transmission of said data has been started, and controlling said switch to maintain the output of said data if the measured data transmission time is less than or equal to a predetermined normal transmission time and to stop the output of said data if said measured data transmission time is greater than said normal transmission time.

3. The apparatus as set forth in claim 2, wherein said transmission control function block is located in any one of a physical coding sub-layer (PCS), physical medium attachment (PMA) sub-layer, and physical medium dependent (PMD) sub-layer of a physical layer of said ONU.

4. An apparatus for transmitting data from an ONU to an OLT in a GE-PON using a TDMA scheme, comprising a transmission control function block for measuring a data transmission time elapsing from the moment when the transmission of said data has been started, for maintaining the transmission of said data if the measured data transmission time is less than or equal to a predetermined normal transmission time, and for stopping the transmission of said data if said measured data transmission time is greater than said normal transmission time.

5. A method for transmitting data from an ONU/OLT to an OLT/ONU in a GE-PON using a TDMA scheme, comprising the steps of:
    a) stopping the transmission of said data due to the occurrence of an error in an upper layer; and
    b) turning off a laser of a PMD sub-layer of a physical layer irrespective of a laser control signal from a multipoint media access control (MAC) control layer if the transmission of said data is stopped, said multipoint MAC control layer being an upper layer of a PMA sub-layer of said physical layer.

6. The method as set forth in claim 5, wherein said step a) includes the steps of:
    a-1) measuring a data transmission time when transmitting said data;
    a-2) comparing the measured data transmission time with a predetermined normal transmission time; and
    a-3) maintaining the transmission of said data if said measured data transmission time is less than or equal to said normal transmission time and stopping the transmission of said data if said measured data transmission time is greater than said normal transmission time.

7. An apparatus for transmitting data from an ONU/OLT to an OLT/ONU in a GE-PON using a TDMA scheme, comprising:
    a transmission control function block including a switch for outputting said data to be transmitted to a lower layer, and a transmission controller for measuring a data transmission time elapsing from the moment when the transmission of said data has been started, and controlling said switch to maintain the output of said data if the measured data transmission time is less than or equal to a predetermined normal transmission time and to stop the output of said data if said measured data transmission time is greater than said normal transmission time; and
    a laser controller located in a PMD sub-layer of a physical layer, said laser controller controlling a laser in response to a switch control signal from said transmission control function block and a laser control signal from a multipoint MAC control layer.

8. The apparatus as set forth in claim 7, wherein said laser controller is adapted to control said laser in response to said laser control signal from said multipoint MAC control layer upon determining, on the basis of said switch control signal from said transmission control function block, that an upper layer is normally operated.

9. The apparatus as set forth in claim 7, wherein said laser controller is adapted to keep said laser off irrespective of said laser control signal from said multipoint MAC control layer upon determining, on the basis of said switch control signal from said transmission control function block, that an upper layer is abnormally operated.

10. The apparatus as set forth in claim 7, wherein said transmission controller is a jabber controller.

* * * * *